April 21, 1925.

G. G. OLIVER ET AL 1,534,863

APPARATUS FOR ANNEALING GLASSWARE

Filed Jan. 31, 1923

3 Sheets-Sheet 2

INVENTORS
George G. Oliver and
Thomas Stenhouse

BY

Clarence Kerr
ATTORNEY

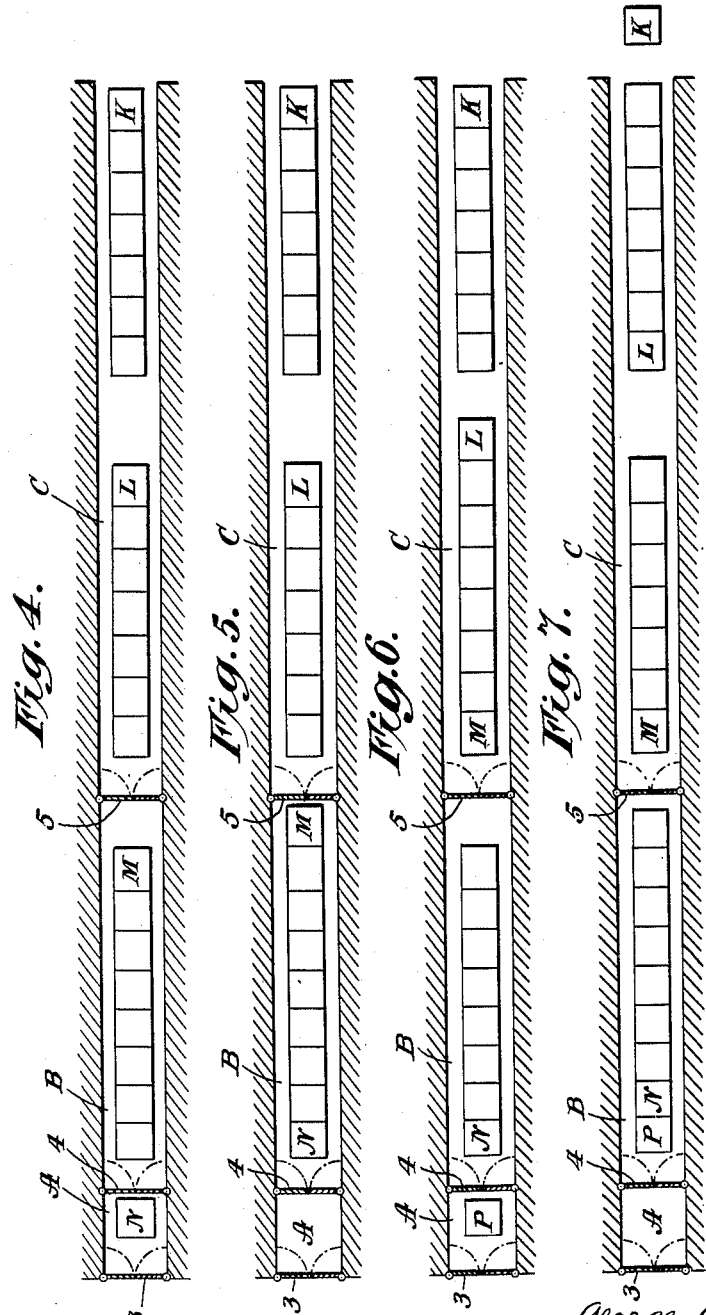

Patented Apr. 21, 1925.

1,534,863

UNITED STATES PATENT OFFICE.

GEORGE G. OLIVER, OF WHEELING, WEST VIRGINIA, AND THOMAS STENHOUSE, OF WASHINGTON, PENNSYLVANIA, ASSIGNORS TO HAZEL-ATLAS GLASS COMPANY, OF WHEELING, WEST VIRGINIA, A CORPORATION OF WEST VIRGINIA.

APPARATUS FOR ANNEALING GLASSWARE.

Application filed January 31, 1923. Serial No. 616,004.

*To all whom it may concern:*

Figure 1:
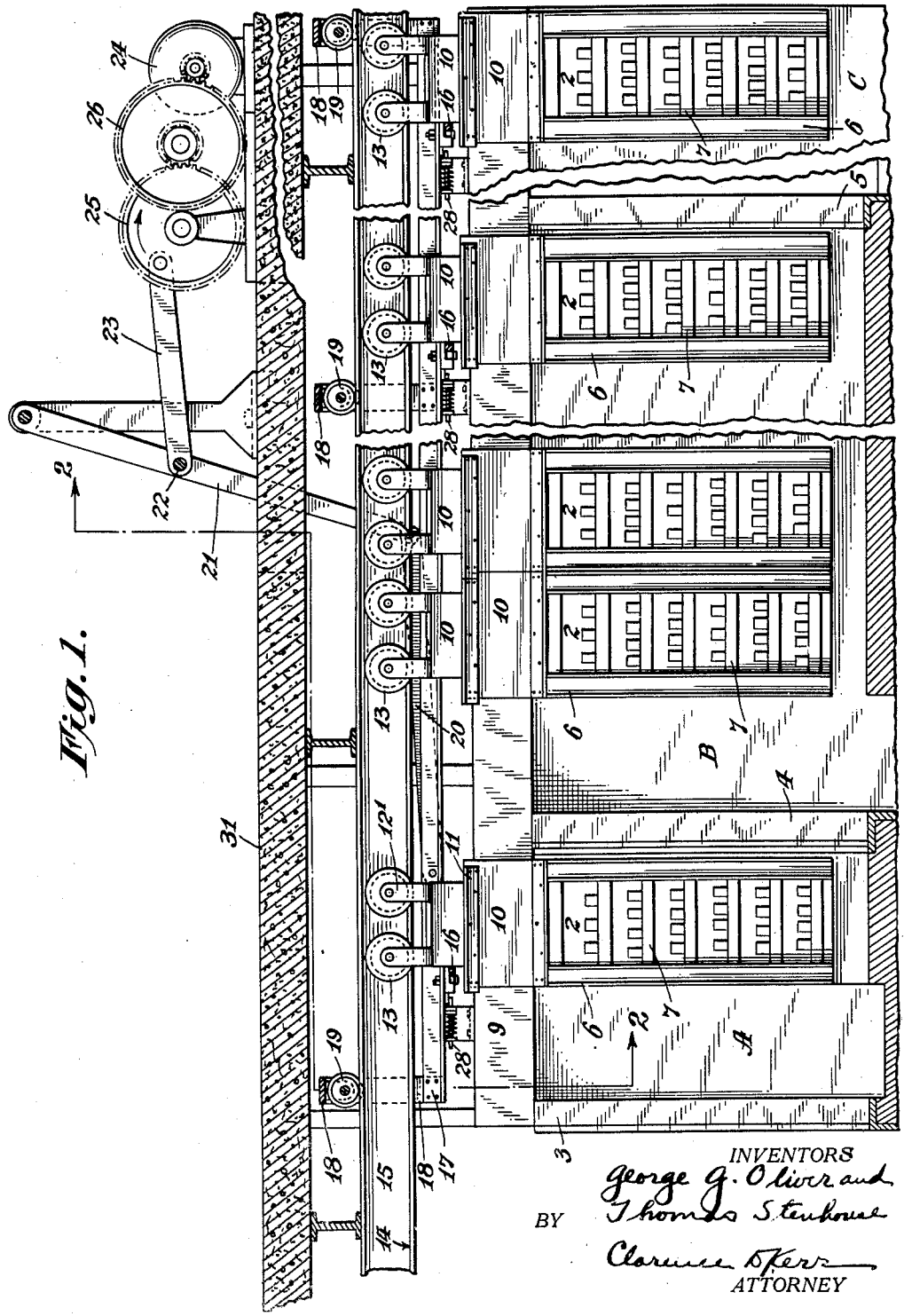
Figure 2:
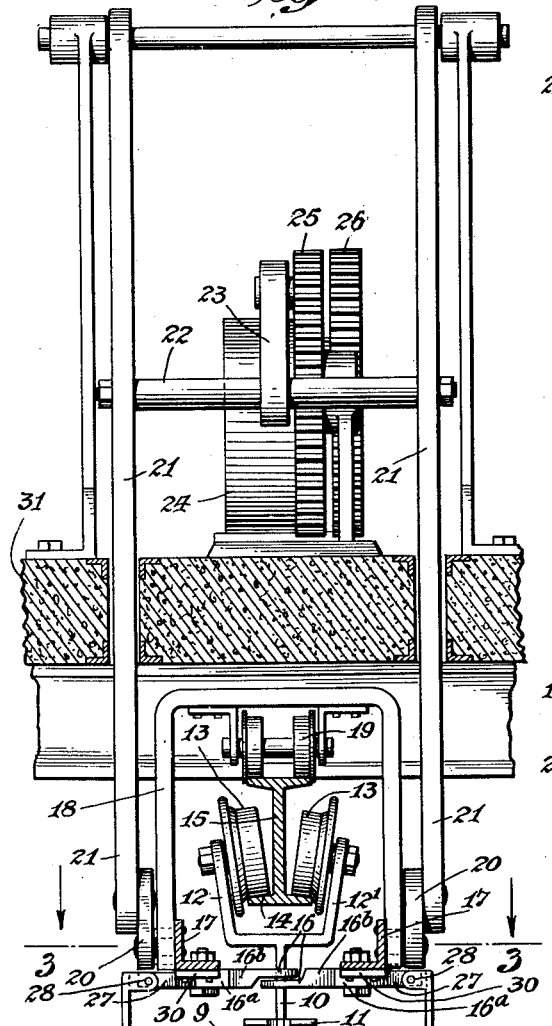
Figure 3:
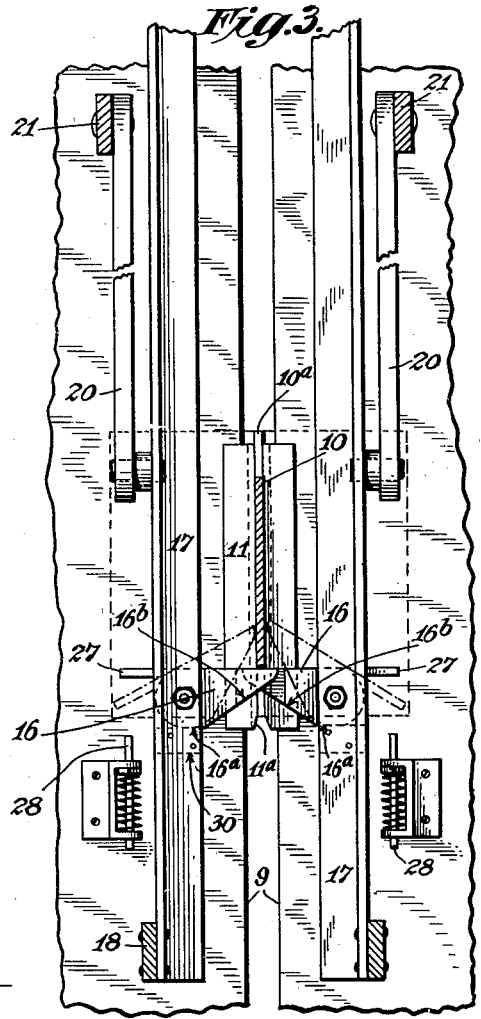

Be it known that we, GEORGE G. OLIVER and THOMAS STENHOUSE, citizens of the United States, residing, respectively, at Wheeling, Ohio County, West Virginia, and Washington, Washington County, Pennsylvania, have jointly invented new and useful Improvements in Apparatus for Annealing Glassware, of which the following is a specification, reference being had to the accompanying drawings, in which:

Fig. 1 is a longitudinal section of our improved apparatus; Fig. 2 is a section on lines 2—2 thereof; Fig. 3 is a section on lines 3—3 of Fig. 2; and Figs. 4, 5, 6 and 7 show diagrammatically the progress of the containers for the glassware as they move through the entering, annealing, and cooling chambers.

Our invention relates to the annealing of glassware and comprises apparatus for tempering or annealing and cooling the glassware, and at the same time for transferring the glassware from the forming machines to the packing room. Our invention in particular relates to the mechanism for moving the containers, to the heating means, and to the various features which we shall hereinafter describe and claim.

Referring to the drawings, the containers 2 for the glassware are arranged, after being loaded at or near the forming machines (not shown), to be moved into an ante-chamber A, then into an annealing chamber B, which may be heated by any suitable means, and finally into a cooling chamber C. The ante-chamber A has doors 3 through which the containers 2 are admitted, and doors 4 through which they are advanced into the annealing chamber B, while the doors 5 mark the division between the annealing and cooling chambers. All of the doors 3, 4 and 5 swing in the direction of travel of the containers, but normally are in closed position, as is shown in Figs. 4–7. The containers are preferably made of the following construction.

A rectangular frame 6 carries a series of brackets 7 upon which the slidable trays 8 are supported. The front and sides of the frame 6 are open to permit the proper circulation of heat therethrough to effect annealing, while the back is closed to check back drafts through the annealing chamber. The top of the container is also closed, to minimize the escape of heat through the narrow longitudinal slot 9 in the top of the furnace, but the container bottoms are perforated to permit a uniform distribution of heat through the mass of ware carried in the container. The container is supported by plate 10, which is attached to the top of the container and extends upwardly through the slot 9, and carries baffle plates 11 which serve to restrict the size of the opening and lessen the amount of heat which otherwise would escape through the slot 9. Each pair of baffle plates 11 extends slightly to the rear of the plate 10, to which it is attached, and so provides a slot $11^a$ which has bevelled edges, as is shown in Fig. 3, into which the forwardly projecting end $10^a$ of the plate 10 on the succeeding container enters. This slot and projection engagement prevents any swaying tendency as the containers pass through the apparatus. The upper edge of the plate 10 terminates in the oppositely disposed brackets 12, 12', which carry the supporting wheels 13 from which the containers are suspended. The wheels 13 travel along the upwardly disposed faces of flanges 14 of the I-beam 15, which is suspended above slot 9.

The mechanism for advancing the containers is comprised of pairs of grippers 16 (of which we have shown three pairs) pivoted on the longitudinal bars 17, which are carried by the yokes 18 and the rollers 19 which travel along the top of the I-beam 15, and are reciprocated by the links 20 and 21, cross piece 22 and crank 23. The motor 24 through the gears 25 and 26 drives the crank 23. The motor 24 is preferably mounted on the roof 31 of the apparatus, which is slotted for the reciprocation of the links 21. The grippers 16 have rearwardly extending projections 27, which at the end of the return stroke of the bars 17 are engaged by the spring stops 28 which act to rotate the grippers 16 about their pivots so that they will extend across the vertical axis of the slot 9 in position to engage the rearward edges of the supporting plates 10 of the containers 2. The grippers 16 are prevented, during the forward movement of the bars 17, from rotating rearwardly from a position at right angles to the bars 17 by the bearing of the flattened faces $16^a$ of the fingers against the stops 30 on the under side of the bars 17. The grippers 16 during rearward movement of the bars 17 are free to rotate about their pivots and, as is shown in dotted position in Fig. 3, because of their inclined faces 16$^b$ slide freely along the sides of the plates 10.

In the operation of our device the containers 2 are loaded with ware near the receiving end of the machine and, suspended from the I-beam 15, are pushed by hand through the doors 3 into the ante-chamber A, the purpose of which is to prevent too great an escape of heat from the chamber B.

On reciprocation of the conveying mechanism the first set of grippers 16 is brought into engaging position by having their projections 27 come into engagement with the spring stops 28. They then engage the plate 10 of the container 2, which is in the chamber A, as is shown in Fig. 1, and push it forwardly through the swinging doors 4 into the annealing chamber B, a distance sufficient to permit the doors 4 to swing shut. If there are other containers in the annealing chamber B, the container thus entering will engage and advance these other containers toward the exist end of the chamber B, where the foremost container is similarly engaged by the second set of grippers 16 and advanced through the doors 5 into the cooling chamber C. A third set of grippers, preferably located midway of the cooling chamber C, pushes one of the containers and the others in front of it toward the exit of the cooling chamber C. The length of the pushing stroke of the grippers is preferably approximately twice the length of a container.

In Figs. 4, 5, 6 and 7 we have shown diagrammatically the progress of the containers through the furnace. In Fig. 4 the container N is in the ante-chamber A ready to be engaged by the grippers and to be moved into the chamber B. In Fig. 5 the container N has been advanced into the chamber B, and the container M has been pushed by the intermediate containers into position for engagement by the intermediate pair of grippers 16. In Fig. 6 a new container P has been placed in the ante-chamber A, and the container M has been advanced from the compartment B into the compartment C. The next stroke of the bars 17 will carry the container P into the compartment B, thus moving all the containers in B forward one step, and the third set of grippers 16 will then move the container L forward and the containers in advance of it, thus pushing the container K out of the furnace, as is shown in Fig. 7.

When the containers are banked in the annealing chambers the currents of heat, as the sides of the containers are open, pass freely from side to side, and the perforations in the container bottoms also permit the effective circulation of heat through the bottoms. By the use of our invention we have provided apparatus which utilizes the furnace capacity to the utmost and enables one man to deliver the output of a number of forming machines to the annealing furnace, the action of which is entirely automatic, and feeds the container uniformly and continuously through the ante-chamber and the annealing and cooling chambers, subjecting them to the desired annealing temperature in the chamber B and also providing for uniform and progressive cooling in the chamber C.

The terms and expressions which we have employed are used as terms of description and not of limitation, and we have no intention, in the use of such terms and expressions, of excluding any mechanical equivalents of the features shown and described, or portions thereof, but recognize that various structural modifications are possible within the scope of the invention claimed.

What we claim is:

1. In apparatus for annealing glassware, an annealing lehr having inlet and discharge ends and also having an ante-chamber, an annealing chamber and a cooling chamber arranged endwise of each other, dividing means between each two of the chambers, containers for a plurality of trays of glassware, a suspension for each of the containers, an overhead trackway along which each suspension moves, and means for moving each of the containers successively from chamber to chamber during the annealing operation.

2. In apparatus for annealing glassware, an annealing lehr having inlet and discharge ends and also having an ante-chamber, an annealing chamber and a cooling chamber arranged endwise of each other, dividing means between each two of the chambers, containers for a plurality of trays of glassware, a suspension for each of the containers, an overhead trackway along which each suspension moves, and means for moving each of the containers successively from one to another of said chambers during the annealing operation, each of said containers when so actuated comprising means for moving other containers in the direction of the discharge end.

3. In apparatus for annealing glassware, an annealing lehr having inlet and discharge ends and also an ante-chamber, an annealing chamber and a cooling chamber arranged endwise of each other, dividing means between each two of the chambers, a series of containers for a plurality of trays of glassware, each container having open sides to permit the heating currents to pass therethrough to effect annealing when in the annealing chamber, and means for causing the regulated and successive movement of each of the said containers through said ante-, annealing, and cooling chambers.

4. In apparatus for annealing glassware, an annealing lehr having inlet and discharge ends, a series of containers each carrying a plurality of trays of glassware, a suspension for each of the containers from an overhead trackway, a plurality of reciprocating means engaging each of the containers in succession for advancing said container through said lehr, the said reciprocating means being inoperative during the return stroke.

5. In apparatus for annealing glassware, an annealing lehr having inlet and discharge ends, a series of containers for a plurality of trays of glassware arranged in tandem, a suspension for each container from an overhead trolley, and a plurality of reciprocating means engaging and actuating each such suspension successively in the lehr, said means being operative on the forward stroke and inoperative on the return stroke.

6. Apparatus for annealing glassware having a longitudinally disposed annealing chamber, containers for the glassware arranged to be moved longitudinally through the chamber, a supplemental chamber above the annealing chamber containing a trolley rail, the roof of the annealing chamber having a longitudinal slot, an overhead trolley suspension in said supplemental chamber extending through the slot for each container, and actuating means operating along said rail and engaging each such trolley suspension in succession.

7. In apparatus for annealing glassware, an annealing lehr having inlet and discharge ends, a series of containers for a plurality of trays of glassware arranged in tandem, a suspension for each container from an overhead trolley, and reciprocating means engaging and actuating each such suspension successively, said means comprising grippers free on the return stroke to rotate out of actuating position and arranged to be rotated at the end of the return stroke into position to engage one of said suspensions on the succeeding forward stroke.

8. In apparatus for annealing glassware, an annealing lehr having inlet and discharge ends, a series of containers for a plurality of trays of glassware arranged in tandem, a suspension for each container from an overhead trolley, actuating means comprising a pair of reciprocating members having a pair of grippers pivoted thereon, spring stops in the path of the grippers arranged to rotate the grippers into position to engage one of the said suspensions on the forward stroke of the reciprocating members, the said grippers being free to rotate out of effective engagement with succeeding suspensions on the return stroke.

9. In apparatus for annealing glassware, an annealing lehr having inlet and discharge ends and an annealing chamber, swing doors at the ends of the chamber, a series of containers for a plurality of trays of glassware arranged in tandem, a suspension for each container from an overhead trolley, and a plurality of reciprocating means engaging and actuating each such suspension in the lehr and arranged to advance it successively through the said doors, said means being operative on the forward stroke and inoperative on the return stroke, and said doors being opened successively by the movement of each container.

GEORGE G. OLIVER.
THOMAS STENHOUSE.